United States Patent [19]

Baba et al.

[11] Patent Number: 5,066,524
[45] Date of Patent: Nov. 19, 1991

[54] CRYSTALLIZED GLASS ARTICLE WITH COLORED SMALL MASSES DISPERSED IN A SURFACE THEREOF

[75] Inventors: Yasuhiro Baba, Hikone; Masanori Moritake, Nagahama; Takashi Sakane, Kusatsu; Yoshio Hashibe, Gamou; Takehiro Shibuya, Yasu, all of Japan

[73] Assignee: Nippon Electric Glass Co., Ltd., Otsu, Japan

[21] Appl. No.: 412,851

[22] Filed: Sep. 26, 1989

[30] Foreign Application Priority Data

Sep. 27, 1988 [JP] Japan .................. 63-243052

[51] Int. Cl.$^5$ .................. B44F 9/04
[52] U.S. Cl. .................. 428/15; 428/67; 428/195; 501/4; 501/13; 501/14; 501/32
[58] Field of Search .................. 501/4, 13, 14, 32; 428/426, 427, 428, 15, 67, 195

[56] References Cited

U.S. PATENT DOCUMENTS

| | | | |
|---|---|---|---|
| 3,955,989 | 5/1976 | Nakamura | 501/5 |
| 3,964,917 | 6/1976 | Nakamura | 501/5 |
| 4,618,538 | 10/1986 | Emonts et al. | 501/14 |
| 4,767,725 | 8/1988 | Mizutani et al. | 501/3 |

FOREIGN PATENT DOCUMENTS

| | | | |
|---|---|---|---|
| 0147221 | 7/1985 | European Pat. Off. | 428/67 |
| 2908869 | 9/1980 | Fed. Rep. of Germany | 428/67 |
| 51-097611 | 8/1976 | Japan | 501/32 |
| 60-049145 | 10/1985 | Japan . | |
| 63-040736 | 2/1988 | Japan . | |

*Primary Examiner*—William R. Dixon, Jr.
*Assistant Examiner*—Anthony J. Green
*Attorney, Agent, or Firm*—Collard, Roe & Galgano

[57] ABSTRACT

A crystallized glass article with a colored surface pattern, which comprises a crystallized glass substrate having a surface and small glass masses having a color different from the substrate and dispersed and fusion-bonded in the surface to form the colored surface pattern. The crystallized glass article is produced by depositing and dispersing small glass masses with a color on a surface of a substrate of a crystallizable glass with a different color which can precipitate crystals therein with softening and deforming by heat-treating at a heat treating temperature higher than the softening point of the crystallizable glass, then heating the substrate together with the small glass masses at the heat treating temperature.

5 Claims, 1 Drawing Sheet

CRYSTALLIZED GLASS ARTICLE WITH COLORED SMALL MASSES DISPERSED IN A SURFACE THEREOF

BACKGROUND OF THE INVENTION

1) Field of the Invention

The present invention relates to crystallized glass articles having surface patterns imparting to them an appearance such as granite, marble or other natural stones which are adaptable for use as heat resistant, incombustible ornamental wall materials for buildings and the like, and in particular, to such crystallized glass articles having a surface pattern of a desired color or colors.

2) Description of the Prior Art

As substitution of natural marble for ornamental building materials, crystallized glass articles have been proposed which have high mechanical strength, excellent heat resistance and excellent efflorescence resistance.

U.S. Pat. No. 3,761,235 (Reference 1) discloses crystallized glass articles having marble-like appearance. The crystallized glass article is produced by heat-treating a crystallizable $CaO-Al_2O_3SiO_2$ glass, which consists essentially of 15-40 wt % of CaO, 3-35 wt % of $Al_2O_3$ and 40-75 wt % of $SiO_2$.

U.S. Pat. No. 3,964,917 (Reference 2) discloses another crystallized glass article which is also provided with marble-like appearance. The crystallized glass is produced by heat treating a crystallizable $CaO-Al_2O_3-SiO_2-ZnO$ glass consists essentially of 15-25 wt % of CaO, 3-13 wt % of $Al_2O_3$, 50-65 wt % of $SiO_2$ glass and 2-10 wt % of ZnO.

Japanese Patent Publication (JP,B2) No. 60-49145 (Reference 3) also discloses another crystallized glass article which consists essentially of 40-59% of $SiO_2$, 15-25% of $Al_2O_3$, 0-12% of MgO, 0-12% of ZnO, 1-5% of $TiO_2$, 2-10% of $B_2O_3$, 4-13% of $Na_2O$, 0-3% of $ZrO_2$, 0-5% of $K_2O$, 0-5% of CaO, 0-5% of BaO, 0-1% of $As_2O_3$, and 0-1% of $Sb_2O_3$ based on the percentage by weight.

The above-described crystallized glass articles can be colored by addition of a coloring agent. However, it is difficult to make a desired surface color pattern of different colors.

U.S. Pat. No. 3,955,989 (Reference 4) discloses a crystallized glass article having a surface pattern like granite, marble or other natural stones which is formed by heat-treatment of collected small crystallizable glass masses. Each of the small masses precipitates needle-like β-wollastonite crystals by the heat-treatment which extend from the surface of the small mass into the interior in a direction generally perpendicular to the surface of the small mass to thereby produce the surface pattern defined by the small masses forming the surface layer. Reference 4 also discloses a crystallized glass article having a colored pattern by spraying or applying a solution containing coloring ions onto the collected small masses prior to the heat-treatment. The coloring ions diffuse into the small masses so that the article is colored. However, the article has only a light color. That is, it is impossible to produce an article having a bright colored or a high contrast colored pattern.

JPA 63-40736 (Reference 5) discloses a method for producing a crystallized glass article with a colored pattern by mixing a crystallizable $CaO-Al_2O_3-SiO_2$ glass powder and another crystallizable glass powder of $CaO-Al_2O_3-SiO_2$ glass containing a coloring agent to form a mixture, then compacting the mixture to form a compact of a desired shape and heating the compact. However, it is difficult by the method to produce a large article because the compact is readily destroyed.

SUMMARY OF THE INVENTION

It is an object of the present invention is to provide a crystallized glass article having a colored surface pattern wherein a plurality of colored regions with desired shapes are dispersed in a surface layer of a crystallized glass body of a different color.

It is another object of the present invention to provide a method for readily producing a crystallized glass article of a comparatively large size with a colored surface pattern.

According to the present invention, a crystallized glass article with a colored surface pattern is obtained which comprises a substrate of a first crystallized glass having a surface and small glass masses dispersed and fusion-bonded in the surface of the substrate the substrate and the small glass masses being different from each other in color to form the colored surface pattern.

The crystallized glass article with a colored surface pattern is produced by a method which comprises steps of: preparing a substrate of a first crystallizable glass which can precipitate crystals therein with softening and deforming by heat-treating at a heat treating temperature higher than the softening point of the crystallizable glass, and also preparing small glass masses with a color different from the first crystallizable glass; depositing and dispersing said small glass masses on a surface of said substrate; heating said substrate together with said small glass masses at said heat treating temperature to thereby precipitate crystals in said substrate while said substrate being softened and deformed to permit said small glass masses to be fusion-bonded into a surface layer of said substrate; and cooling said substrate together with said small glass masses to obtain a crystallized glass substrate with said small glass masses fusion-bonded in the surface layer to provide a colored surface pattern.

The small glass masses can be made of a second crystallizable glass which is crystallized at the heating step. Each of the first and the second crystallizable glasses contains at least one element selected from a group consisting of $MnO_2$, $Fe_2O_3$, CoO, $Cr_2O_3$, NiO, CuO and $V_2O_5$ as an additive for coloring agent.

An example of the first and the second crystallizable glasses essentially consists of 40-59% of $SiO_2$, 15-25% of $Al_2O_3$, 0-12% of MgO, 0-12% of ZnO, 1-5% of $TiO_2$ 2-10% of $B_2O_3$ 4-13% of $Na_2O$, 0-3% of $ZrO_2$, 0-5% of $K_2O$, 0-5% of CaO, 0-5% of CaO, 0-1% of $As_2O_3$, and 0-1% of $Sb_2O_3$ based on the percentage by weight percent.

The small glass masses may be made of a colored glass which essentially consists of 40-59% of $SiO_2$, 15-25% of $Al_2O_3$, 0-12% of MgO, 0-12% of ZnO, 2-10% of $B_2O_3$, 4-13% of $Na_2O$, 0-5% of $K_2O$, 0-5% of CaO, 0-5 of BaO, 0-1% of $As_2O_3$, and 0-1% of $Sb_2O_3$. The colored glass further contains at least one element selected from a group consisting of $MnO_2$, $Fe_2O_3$, CoO, $Cr_2O_3$, NiO, CuO and $V_2O_5$ as an additive for the coloring agent.

According to the present invention, the small masses are fusion-bonded in the surface layer of the substrate which can be produced by a conventional glass plate producing method. Therefore, it is possible by simple processes to produce a large sized crystallized glass article with a desired colored surface pattern.

DESCRIPTION OF PREFERRED EMBODIMENTS

Figure 1:
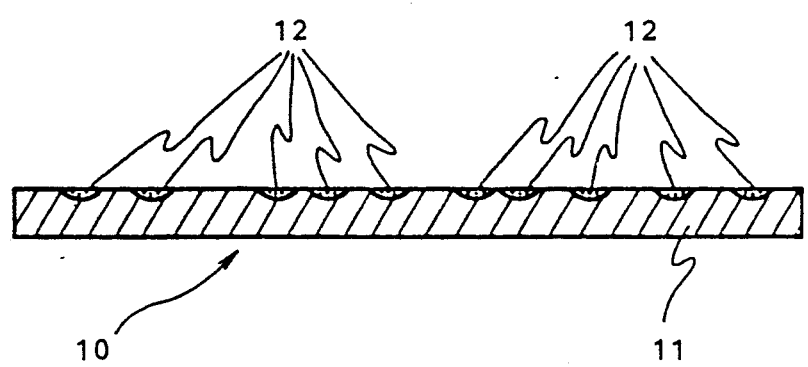
FIG. 1 is a sectional view of a crystallized glass article according to an embodiment of the present invention.

Various known crystallizable glass can be used for the substrate and the small glass masses in the crystallized glass article of the present invention.

In the following examples, a crystallizable glass is used which essentially consists of 40-59% of $SiO_2$, 15-25% of $Al_2O_3$, 0-12% of $MgO$, 0-12% of $ZnO$, 1-5% of $TiO_2$, 2-10% of $B_2O_3$, 4-13% of $Na_2O$, 0-3% of $ZrO_2$, 0-5% of $K_2O$, 0-5% of $CaO$, 0-5% of $BaO$, 0-1% of $As_2O_3$, and 0-1% of $Sb_2O_3$ based on the percentage by weight. The crystallizable glass is known in Reference 3 Japanese Patent Publication 60-49145).

Description will be made as to the reason why ingredients of the crystallizable glass are determined as described above.

$SiO_2$ is a main element of precipitated crystals. Use of $SiO_2$ less than 40% makes the chemical resistance of the glass insufficient. While, $SiO_2$ of an amount of more than 59% reduces a melting property of the glass.

$Al_2O_3$ is also an element of the precipitated crystals. When an amount of $Al_2O_3$ is less than 15%, the glass is difficult in crystallization. Use of $Al_2O_3$ more than 25% reduces the melting property of the glass.

$MgO$ and $ZnO$ are also elements of precipitated crystals. Use of them more than 12% degrades a surface brilliance or luster of the glass after crystallized and also make it difficult to bend the crystallized glass by reheating.

$TiO_2$ is a nucleating element. When it is less than 1%, nucleation is insufficient. Use of it more than 5% makes the crystallized glass with undesired black color.

$B_2O_3$ is a flux for improving the melting property of the glass. When the amount is less than 2%, the melting property is degraded. Use of more than 10% badly affects the crystallization of the glass.

$Na_2O$ is also another flux. Use of less than 4% reduces the melting property of the glass, while more than 13% reduces the chemical property of the crystallized glass.

$ZrO_2$ is an element for aiding the nucleating function of the $TiO_2$. However, use of it more than 3% reduces the melting property of the glass.

An amount of each of $K_2O$, $CaO$ and $BaO$ is 5% at maximum. If more than 5% is used, the glass is degraded in crystallization and prolongs the time required for the heating treatment.

$As_2O_3$ and $Sb_2O_3$ are used as refining agents. Use of them more than 1% makes the glass with an undesired black color.

The crystallizable glass has a thermal expansion coefficient of $60°-80° \times 10^{-7}/°C$. and a softening point of $900°-1,000°$ C. The crystallizable glass is soften and crystallized by heat-treatment at a temperature of $900°-1,100°$ C.

The substrate used in the crystallized glass article according to the present invention is made of the crystallizable glass.

The small glass masses used in the crystallized glass article are necessary to have a thermal expansion coefficient and a softening point approximating those of the substrate. Therefore, the above-described crystallizable glass is also used for the small glass masses in the following examples.

However, the substrate and the small glass masses are necessary to be different from each other in color in order to the colored surface pattern. Therefore, one of the substrate and the small masses contain a coloring agent as an additive. The coloring agent is at least one element selected from a group of $MnO_2$, $Fe_2O_3$, $CoO$, $Cr_2O_3$, $NiO$, $CuO$ and $V_2O_5$.

Table 1 shows colors of the above-described crystallizable glass and the glass containing respective coloring agents, before and after heat-treatment (H.T.) for crystallization.

TABLE

| Coloring Agent | Color | |
|---|---|---|
| | Before H.T. | After H.T. |
| $MnO_2$ | Brown | Yellowish White |
| $Fe_2O_3$ | Dark Brown | Gray |
| $CoO$ | Blue | Greenish Blue |
| $Cr_2O_3$ | Green | Pinkish White |
| $NiO$ | Orange Yellow | Yellow Green |
| $CuO$ | Orange Yellow | Pinkish White |
| $V_2O_5$ | Orange Yellow | Pinkish White |
| None | Orange Yellow | White |

The small glass masses can be made of a colored glass which essentially consists of 40-59% of $SiO_2$, 15-25% of $Al_2O_3$, 0-12% of $MgO$, 0-12% of $ZnO$, 2-10% of $B_2O_3$, 4-13% of $Na_2O$, 0-5% of $K_2O$, 0-5% of $CaO$, 0-5 of $BaO$, 0-1% of $As_2O_3$, and 0-1% of $Sb_2O_3$. The colored glass further contains at least one element selected from a group consisting of $MnO_2$, $Fe_2O_3$, $CoO$, $Cr_2O_3$, $NiO$, $CuO$ and $V_2O_5$ as an additive for the coloring agent.

Each small glass masses may have a desired shape such as a powdery particle, relatively large crushed shape, a lengthy and thin plate or other shape.

Referring to FIG. 1, a crystallized glass plate 10 according to an embodiment of the present invention comprises a substrate 11 of a crystallized glass and a small glass masses 12 dispersed and fusion bonded in the surface layer of the substrate 11. The crystallized glass substrate 11 and the small glass masses 12 are different from each other in color. Therefore, the glass article has a colored surface pattern.

EXAMPLE 1

A glass plate of substrate was prepared by a conventional glass plate producing method. The glass substrate was made of a crystallizable glass which consisted of 50.4% of $SiO_2$, 20.9% of $Al_2O_3$, 4.8% of $MgO$, 4.1% of $ZnO$, 2.6% of $TiO_2$, 5.2% of $B_2O_3$, 8.0% of $Na_2O$, 1.5% of $ZrO_2$, 2.2% of $K_2O$, and 0.3% of $As_2O_3$ based on the percentage by weight.

On the other hand, a colored glass plate was also prepared which was made of a crystallizable glass similar to the substrate but containing 0.1% of $MnO_2$ as an additive for a coloring agent. The colored glass plate was crushed to form small glass masses which had sizes of 0.1-5 mm.

Then, polyvinyl alcohol (PVA) was uniformly deposited on a surface of the substrate to form a PVA coating and the small glass masses were scattered or dispersed on the PVA coating layer. Thereafter, the substrate was put on a mullite plate coated with alumina powder and was heat-treated together with the small masses at 1,050° C. for one hour, then annealed or slowly cooled. The substrate and the small masses were crystallized by the heat-treatment while the small masses were fusion-bonded into the surface layer of the substrate to form a crystallized glass article or plate. The PVA was evaporated and removed during the heat-treatment.

The resultant crystallized glass plate had a beautiful surface pattern wherein yellowish white small regions of 1-10 mm were dispersed in the white surface of the plate and had a smooth and brilliant surface even before polishing.

It was confirmed that the crystallized glass comprised forsterite ($2MgO \cdot SiO_2$) crystals, garnite ($ZnO \cdot Al_2O_3$) crystals and others precipitated.

EXAMPLE 2

A colored substrate was prepared which was made of the crystallizable glass similar to EXAMPLE 1 but containing additives of 0.1% of $Fe_2O_3$ and 0.1% of CoO as coloring agent. While, a glass plate of the similar crystallizable glass without coloring agent was also prepared and crushed to form small masses of 0.1-5 mm. A crystallized glass article or plate was also produced from those colored substrate and small masses in the similar manner as in EXAMPLE 1.

The resultant crystallized glass plate had a beautiful surface pattern wherein white small regions of 1-10 mm were dispersed in the gray surface of the plate and had a smooth and brilliant surface even before polishing.

EXAMPLE 3

A colored glass plate with a thickness of 8 mm was prepared which consisted of 53.0% of $SiO_2$, 22.4% of $Al_2O_3$, 4.8% of MgO, 4.8% of ZnO, 5.2% of $B_2O_3$, 8.0% of $Na_2O$, 2.2% of $K_2O$, 0.3% of $As_2O_3$, and an additive of 0.1% of CoO as coloring agent on the base of the weight percent. The colored glass plate was cut to obtain a plurality of glass strips each having a 100 mm width.

Those colored glass strips were overlaid and arranged with spaces of 100 mm between adjacent ones on the PVA coating of the substrate prepared in EXAMPLE 1.

Those colored strips and substrate were heat-treated in the condition similar to EXAMPLE 1 to obtain a crystallized glass article or plate.

It was confirmed that the substrate had the forsterite crystals, garnite crystals and others.

The resultant crystallized glass plate also had a beautiful surface pattern wherein greenish blue strips extended with 100 mm spaces from each other in the white surface of the plate and had a smooth and brilliant surface even before polishing.

What is claimed is:

1. A crystallized glass article with a colored surface pattern, which comprises a substrate of a first crystallized glass of a first color having a surface and small glass masses of a second color dispersed and fusion-bonded in the surface of said substrate, said substrate and said small glass masses cooperatively defining said colored surface pattern, said colored surface pattern composed of a plurality of colored glass masses of said second color dispersed in a surface layer of said substrate of said first color.

2. A crystallized glass article with a colored surface pattern, which comprises a substrate of a first crystallized glass of a first color having a surface and small glass masses of a second color dispersed and fusion-bonded in the surface of said substrate, said substrate and said small glass masses cooperatively defining said colored surface pattern, said colored surface pattern composed of a plurality of colored glass masses of said second color dispersed in a surface layer of said substrate of said first color, wherein said small glass masses are made of a second crystallized glass, each of said first and said second crystallized glass consists essentially of 40-59% of $SiO_2$, 15-25% of $Al_2O_3$, 0-12% of MgO, 0-12% of ZnO, 1-5% of $TiO_2$, 2-10% of $B_2O_3$, 4-13% of $Na_2O$, 0-3% of $ZrO_2$, 0-5% of $K_2O$, 0-5% of CaO, 0-5% of BaO, 0-1% of $As_2O_3$, and 0-1% of $Sb_2O_3$ based on the percentage by weight; and one of said first and said second crystallized glass having a coloring agent as an additive.

3. A crystallized glass article as claimed in claim 2, wherein said coloring agent is at least one element selected from a group consisting of $MnO_2$, $Fe_2O_3$, CoO, $Cr_2O_3$, NiO, CuO and $V_2O_5$.

4. A crystallized glass article with a colored surface pattern, which comprises a substrate of a first crystallized glass of a first color having a surface and small glass masses of a second color dispersed and fusion-bonded in the surface of said substrate, said substrate and said small glass masses cooperatively defining said colored surface pattern, said colored surface pattern composed of a plurality of colored glass masses of said second color dispersed in a surface layer of said substrate of said first color;

wherein said small glass masses are made of a colored glass which consists essentially of 40-59% of $SiO_2$, 15-25% of $Al_2O_3$, 0-12% of MgO, 0-12% of ZnO, 2-10% of $B_2O_3$, 4-13% of $Na_2O$, 0-5% of $K_2O$, 0-5% of CaO, 0-5% of BaO, 0-1% of $As_2O_3$ and 0-1% of $Sb_2O_3$ based on the percentage by weight, having a coloring agent as an additive, said coloring agent being at least one element selected from a group consisting of $MnO_2$, $Fe_2O_3$, CoO, $Cr_2O_3$, NiO, CuO, and $V_2O_5$.

5. A heat resistant, incombustible, ornamental wall material for buildings with a colored surface pattern which comprises a substrate of a first crystallized glass of a first color having a surface and small glass masses of a second color dispersed and fusion-bonded in the surface of said substrate, said substrate and said small glass masses cooperatively defining said colored surface pattern, said colored surface pattern composed of a plurality of colored glass masses of said second color dispersed in a surface layer of said substrate of said first color to thereby impart thereto the appearance of a natural building stone.

* * * * *